June 10, 1952  R. J. HARPER  2,600,244
BLADE COUPLING ATTACHMENT FOR TRACTORS
Filed Oct. 3, 1947

Inventor

Ray J. Harper

By *Clarence A. O'Brien and Harvey B. Jacobson*
Attorneys

Patented June 10, 1952

2,600,244

UNITED STATES PATENT OFFICE 2,600,244

BLADE COUPLING ATTACHMENT FOR TRACTORS

Ray J. Harper, Menlo Park, Calif.

Application October 3, 1947, Serial No. 777,609

1 Claim. (Cl. 37—144)

This invention relates to new and useful improvements in blade coupling attachments for garden tractors and the primary object of the present invention is to provide a connector between the scraper blade and hydraulic lift mechanism of a garden tractor that is so designed as to permit selective pivotal adjustments of the scraper blade relative to the direction of travel of the tractor.

Another important object of the present invention is to provide a blade coupling attachment for tractors that is quickly and readily applied to the lift mechanism of a tractor to be raised or lowered by the same.

A further object of the present invention is to provide a coupling attachment for tractors that is so designed as to permit the tractor scraper blade to be disposed at selected acute angles to the longitudinal axis of the tractor on which the same is applied.

A still further aim of the present invention is to provide a blade coupling attachment for garden tractors that is simple and practical in construction, strong and reliable in use, relatively inexpensive to manufacture, and otherwise well adapted for the purposes for which the same is intended.

Figure 1:
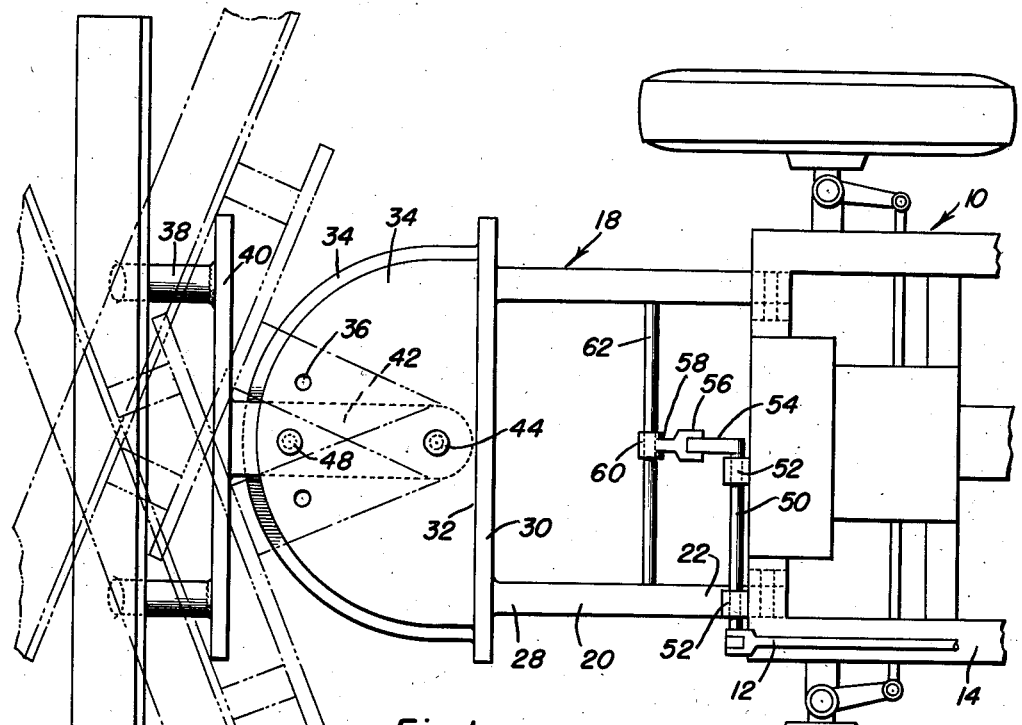
Figure 2:
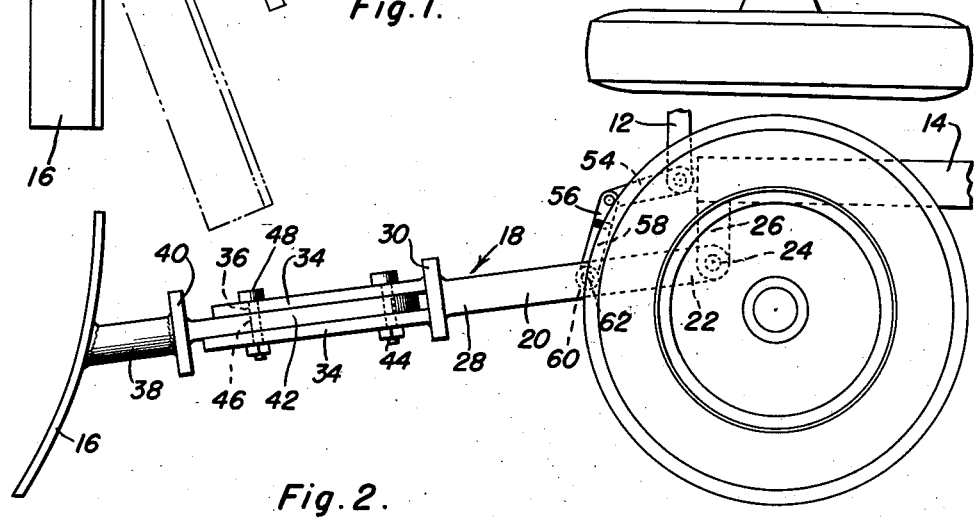

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary top plan view of the forward portion of a conventional garden tractor, and showing the present invention applied between the scraper blade and hydraulic lift arm of the tractor, and with dotted lines showing pivotal adjustment of the blade relative to the longitudinal axis of the tractor; and, Figure 2 is a side elevational view of Figure 1.

Referring now to the drawings in detail, wherein for the purpose of illustration, there is disclosed a preferred embodiment of the present invention, the numeral 10 represents a conventional garden tractor including a hydraulic lift arm 12, side rails 14, and a forwardly disposed scraper blade 16.

The present application does not attempt to claim the above conventional structure, but it is merely an attachment that is to be used to couple the scraper blade to the forward end of the tractor and to the lift mechanism of the tractor.

To accomplish the desired result, there is provided a substantially U-shaped frame 18 including longitudinally disposed spaced parallel side arms 20, the rear terminals 22 of which are pivoted as at 24 to links 26 depending from the forward ends of the side rails 14. The forward terminals 28 of these arms are rigidly secured to a transverse base plate 30 forming the web portion of the frame 18.

Fixedly secured to the forward face of plate 30, are the rear straight edges 32 of a pair of spaced parallel, substantially semi-circular bearing plates 34, that are provided with a plurality of opposing apertures 36.

A pair of supporting and spacing arms 38 are rigidly secured to the inner face of the blade 16, project rearwardly from the blade, and are secured by welding or the like to a further base plate 40 similar to plate 30. This further base plate 40 is rigidly supported by a rearwardly extending coupling tongue 42 that is slidably mounted between the bearing plates 34 and the rear, free terminal of the tongue 42 is pivotally secured to the bearing plates by use of a removable fastener 44.

Adjacent the fixed, forward end of the tongue 42 there is provided an aperture 46 that selectively opposes and aligns with the apertures 36 and cooperates with the apertures 36 to be removably engaged by a fastener 48, so that the tongue may be adjusted at selected pivotal positions relative to the bearing plates 34 or the direction of travel of the tractor.

In order to raise or lower the frame 18 and hence the blade 16, there is provided a transverse bar 50 which is journalled in bearings 52 carried by the forward end of the tractor. One end of this bar 50 is fixedly connected to the lift arm 12 of the tractor and the opposite end of the bar 50 is bent to form an angular extension 54 that is pivotally mounted between the bifurcated end 56 of a link arm 58. The opposite end of the link arm 58 is provided with a sleeve 60 that is rotatably mounted on a transverse cross bar 62 rigidly carried by the side arms 20.

In practical use of the device, to adjust the angle at which the blade 16 is disposed relative to the longitudinal axis of the tractor, it is merely necessary to remove the fastener 48 and to pivot the tongue 42 until aperture 46 opposes selected apertures 36 in the bearing plates 34. By then re-engaging the fastener 48 in the aligned apertures 36 and 46, the adjustment of the blade 16 to a selected position will be maintained.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention what is claimed as new is:

For use with a tractor having a pair of side rails, a pair of ears depending from the forward ends of the side rails and a lift arm; a blade attachment comprising a pair of side arms pivoted to said ears for vertical swinging movement, a forward face plate joining the forward ends of said side arms, a cross-bar terminally fixed to said side arms, a horizontal rock shaft rotatably supported on said tractor and connected to said lift arm, a link arm having a bifurcated end, said rock shaft having a lateral projection pivoted to said bifurcated end, a sleeve on said link arm and rotatably supported on said cross-bar, a pair of upper and lower parallel plates permanently attached to said face plate, a scraper blade, a pair of supporting and spacing arms rigidly secured to the blade, a base plate terminally secured to said supporting and spacing arms, a tongue permanently attached to said base plate intermediate the ends of said base plate and received between said upper and lower plates, a rear pivot extending through said upper and lower plates and said tongue, said upper and lower plates having a series of circumferentially spaced registering openings spaced equidistant from said rear pivot, said tongue having an aperture intermediate its ends for selectively registering with said openings, and a forward pin received in said aperture and a pair of registering openings in said upper and lower plates for retaining the tongue in a selected pivoted position about said rear pivot.

RAY J. HARPER.

REFERENCES CITED

The following references are of record in the file of this patent:

UNITED STATES PATENTS

| Number | Name | Date |
|---|---|---|
| 1,170,578 | Toy | Feb. 8, 1916 |
| 1,692,750 | Marran | Nov. 20, 1928 |
| 1,788,698 | Wooldridge | Jan. 13, 1931 |
| 1,861,731 | Wooldridge | June 7, 1932 |
| 2,307,655 | Arps | Jan. 5, 1943 |
| 2,426,410 | Owen | Aug. 26, 1947 |